United States Patent [19]

Sawicki et al.

[11] Patent Number: 4,884,461
[45] Date of Patent: Dec. 5, 1989

[54] FORCE SENSOR

[75] Inventors: Wolfgang H. Sawicki, Mannheim, Fed. Rep. of Germany; Tomas L. Svensson, Göteborg, Sweden; Bernd K. Weck, Gorxheimertal; Karl E. Meier-Dörnberg, Rossdorf, both of Fed. Rep. of Germany

[73] Assignee: Sandvik AB, Sandviken, Sweden

[21] Appl. No.: 253,586

[22] Filed: Oct. 5, 1988

[30] Foreign Application Priority Data

Oct. 13, 1987 [SE] Sweden ................... 8703952

[51] Int. Cl.⁴ ............................. B23Q 17/09
[52] U.S. Cl. ........................ 73/862.06; 73/104
[58] Field of Search ............... 73/862.04, 862.06, 104; 340/680

[56] References Cited

U.S. PATENT DOCUMENTS 4,178,799 12/1979 Schmieder et al. ......... 73/862.06 X
4,483,203 11/1984 Capper ..................... 73/862.04
4,600,066 7/1986 Griffen et al. ............. 73/862.65 X
4,741,231 5/1988 Patterson et al. .......... 73/862.06 X Primary Examiner—Charles A. Ruehl
Attorney, Agent, or Firm—Burns, Doane, Swecker & Mathis

[57] ABSTRACT

A force sensor monitors the behavior of cutting tools during machining operations. The sensor is mounted on a machine tool of the type comprising a stable support portion and a carrier which includes a tool holder. The sensor is mounted between the stable support portion and the tool holder. The sensor includes a generally planar plate provided with a stable portion and flexible elements. The carrier is mounted to the flexible elements whereby forces from the tool holder are transmitted to the flexible elements for displacing same. Such displacement is detected by strain gauges mounted on deformable lands which interconnect the stable portion with the flexible elements.

7 Claims, 2 Drawing Sheets

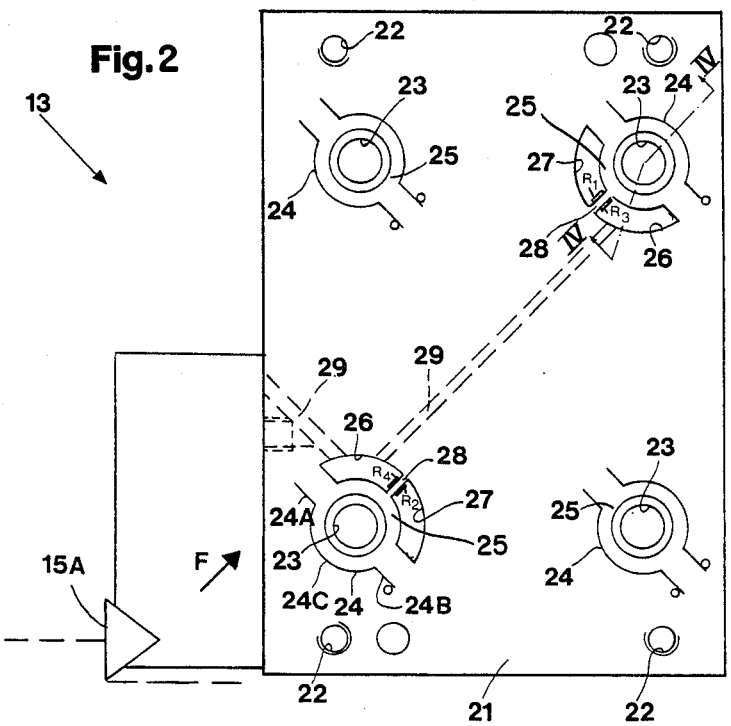
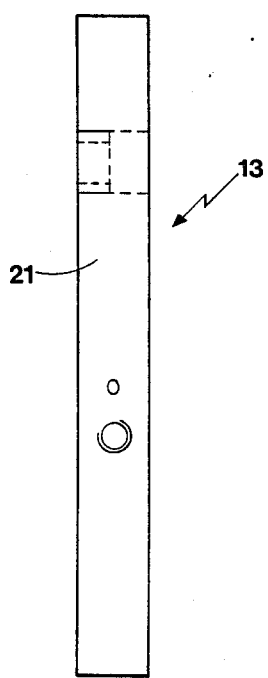
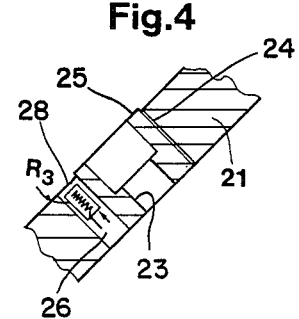
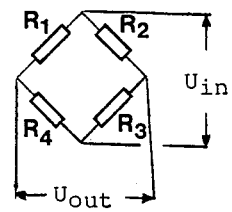

FORCE SENSOR

BACKGROUND AND OBJECTS OF THE INVENTION

The present invention relates to a force sensor for monitoring the behavior of cutting tools during machining operations. The sensor is mounted on a machine tool of the type including a stable support portion and a tool holder having a cutting tool mounted thereon. The force sensor is mounted between said stable support portion and said tool holder. Furthermore the present invention relates to a method for sensing forces during machining of a work piece in a machine tool.

Hitherto known force sensors for monitoring the behavior of cutting tools during machining operations have several drawbacks. In one known device the force sensors are arranged between two separate plates which will give the device a large height and thus instability. Furthermore, the known device is difficult to place within the standard fitting of the machine and it is sensitive to temperature gradients.

One object of the present invention is to provide a force sensor which detects tool wear and initiates tool change to avoid tool breakage which could result in possible machine tool damage and/or scrapped work pieces.

Another object of the present invention is to provide a force sensor which is close to the cutting edge.

Still another object of the present invention is to provide a force sensor which is positioned directly in the path of the transmitted force between the tool and the machine bed.

Still another object of the present invention is to provide a force sensor which primarily measures feed forces - the most accurate indication of tool wear.

Still another object of the present invention is to provide one force sensor for all cutting operations.

Still another object of the present invention is to provide a force sensor which is compensated for direct and indirect thermal drift.

Still another object of the invention is to provide a force sensor which can replace a standard mouting plate between a turret and a cross-slide.

other objects and advantages of the present invention will become apparent in consideration of the present disclosure in its entirety.

THE DRAWINGS

The invention will be more clearly described in connection with the appended drawings in which FIG. 1 shows a principle sketch of a machine tool system including the force sensor according to the present invention, FIG. 2 shows a plan view of the force sensor, FIG. 3 shows a side view of the force sensor, FIG. 4 shows a cross-sectional view according to the line IV—IV in FIG. 2, FIG. 5 shows a Wheatstone-bridge.

DESCRIPTION OF PREFERRED EMBODIMENTS OF THE INVENTION

Figure 1:
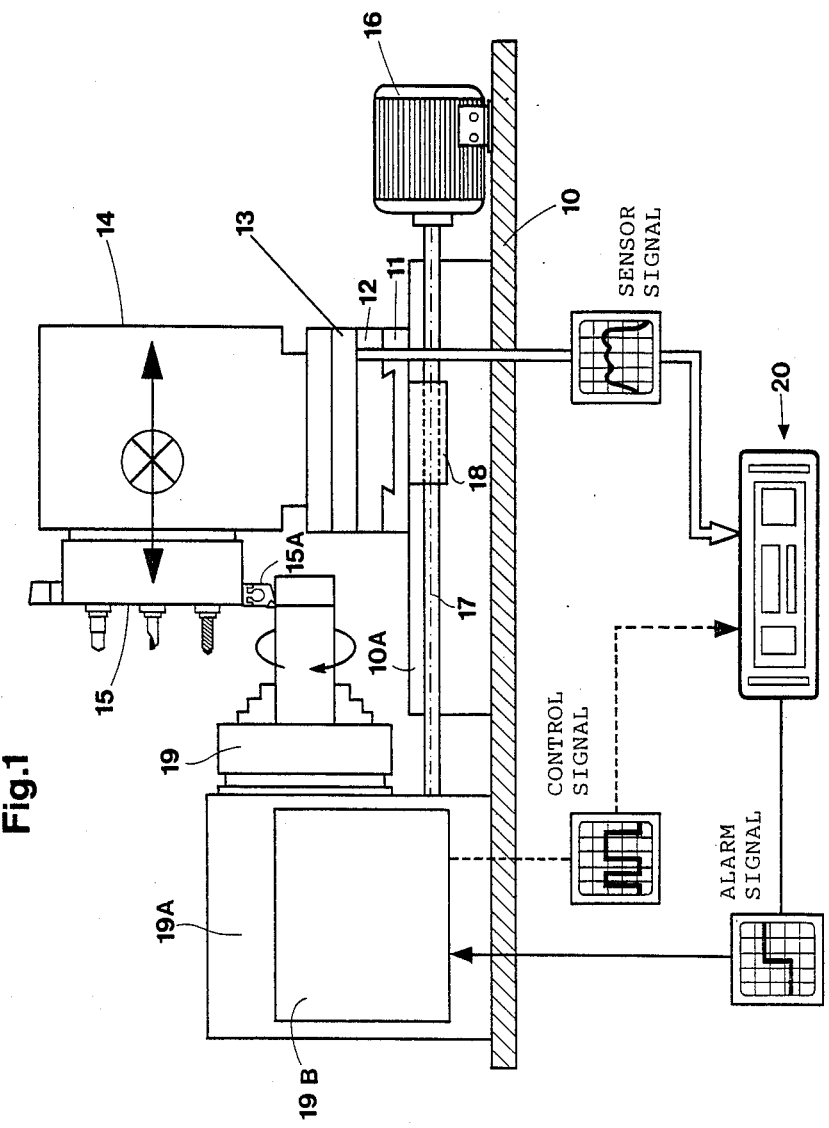

Referring to FIG. 1 a principle sketch of a machine tool system is shown including a base surface 10, a machine bed 10A, a longitudinal slide 11, a cross slide 12, a planar force sensor 13, and a carrier comprising a turret 14, a tool holder 15 and a cutting tool 15A mounted on the tool holder to be in engagement with a work piece. The system further includes a feed motor 16, a feed screw 17, a feed nut 18, a chuck 19 and signal processing means 20. The cross-slide 12 forms a stable support for the plate 13.

The chuck 19 which holds and rotates the work piece, the longitudinal slide 11 and the feed motor 16 are mounted on the base surface 10. The motor drives the feed screw 17 which cooperates with the nut 18 to provide for axial movement thereof. The screw is borne in the chuck housing 19A. The nut 18 is secured to the longitudinal slide 11 which slides on the machine bed 10A. The longitudinal slide carries the cross-slide 12 which is moved by a motor, a feed screw and a nut, not shown, similar to the movement of the longitudinal slide but perpendicular thereto. The force sensor 13 is placed between the turret 14 and the cross-slide such that the plane of the plate becomes generally perpendicular to the tangential forces arising during machining of a work piece. The force sensor is influenced by feed forces and radial forces during the machining. The sensor converts the mechanical forces into electrical signals which can be sent directly to the signal processing means 20. The square box 19B illustrates a computer which controls the machine. When the tool 15A is ready for action the computer sends a start signal to the signal processing means 20 to calibrate it to zero and to put it into a ready-position. Then the cutting tool begins to cut and the resulting cutting feed force causes an electrical voltage signal which is detected by the processing means during the machining. If something happens, such as a tool breakage or if the tool is excessively worn, the means 20 alarms the computer which stops the machine.

The signal processing means comprises micro-processors and displays which provides the user with instantaneous supervision and control of the cutting operation. This eliminates the need for constant manual observation of the cutting operation.

Referring now to FIGS. 2, 3, 4, and 5 an embodiment of a force sensor 13 according to the present invention is shown. The sensor includes a generally planar plate 21 having a generally rectangular basic shape. It should be understood that the plate 21 may have a shape different from rectangular, such as round, triangular or square, depending on the standards of each machine tool manufacturer. The plate 21 is relatively thin, preferably less than 100 mm, and has a number of holes extending perpendicularly therethrough. The plate has a threaded first hole 22 at each corner in order to receive a bolt for connection with the cross-slide 12. Alternatively the corners of the rim of the plate might be welded to the cross-slide. The plate 21 further comprises four second holes 23, threaded or untapped. Each second hole 23 is partially surrounded by a slot 24 which is spaced at a distance from the rim of the second hole. The width of the slot 24 is about 0.5 mm. Each slot extends perpendicularly through the plate and the slot comprises two straight ends 24A and 24B and a midportion 24C, concavely curved relative to the center line of the second hole 23. A first pair of the second holes, generally diagonally opposed, comprises a second slot which is inverted relative to the above-described slot 24. Two elements 25 are thus formed which are flexible relative to the rest of the plate and each of which centrally contain a second hole. The resilient elements 25 are movable in generally one direction F which is the most frequent resultant direction of the radial and axial cutting forces during a longitudinal operation. Thus the tangential cutting force is not measured since that force is transferred directly through the plate into the cross-slide 12. The cutting tool 15A is schematically shown in FIG. 2 without showing the turret 14. The cutting tool 15A is spaced from the plate 21 in the height direction.

A second pair of the second holes 23, generally diagonally opposed, comprises third and fourth slots 26 and 27. The third and fourth slots 26 and 27 have the shape of a segment of a circle ring. A thin land 28 separates said two slots. The land 28 is integral with the plate 21 and the resilient element 25. The lands 28 are directed generally towards each other so as to support respective flexible element 25 in opposite directions.

A strain-gauge R is mounted, preferably by gluing, on each side of each land 28. Those gauges are coupled together so as to form a complete Wheatstone-bridge, (FIG. 5). The function of the bridge is as follows: the gauges R are coupled schematically as a square such that the gauges $R_1$, $R_2$, $R_3$, and $R_4$ appear in the circuit, counted clockwise. An input voltage $U_{in}$ is entered in the circuit between gauges $R_1$ and $R_4$ and between $R_2$ and $R_3$. An output signal $U_{out}$ is measured between the gauges $R_1$ and $R_2$ and between $R_3$ and $R_4$. The well-known Wheatstone formula for measuring strain $\epsilon$ is $$\epsilon_{total} = +\epsilon_1 - \epsilon_2 + \epsilon_3 - \epsilon_4$$

where the suffixes 1, 2, 3, andn 4 refer to respective strain-gauges. When the plate is bolted via the first holes 22 to the cross-slide 12 and bolted to the turret 14 via the second holes the turret will be somewhat flexible relative to the cross-slide since the plate 21 has a stable zone attached to the cross-slide 12 via holes 22, and a flexible zone provided by the flexible elements 25 attached to the turret 14. The lands 28 define interconnecting portions of the plate which interconnect the stable zone and two of the flexible elements 25. The cutting force F arising during the cutting operation will be transferred via the bolts through the second holes whereby forces equivalent to $\frac{1}{4}$ F will act on each resilient element. The land 28 of the element 25 closest to the cutting tool in the horizontal direction will be compressed, which will give the gauges $R_2$ and $R_4$ a negative value, while the land 28 of the element 25 furthest away from the cutting tool will be tensioned, which will give the gauges $R_1$ and $R_3$ a positive value. The output signal $U_{out}$ will thus be proportional to the total strain $$\epsilon_{tot} = +\epsilon_1 - (-\epsilon_2) + \epsilon_3 - (-\epsilon_4) = 4\epsilon$$

provided that the thicknesses of the two lands 28 are equal. This sensor is not sensitive to changes in temperature because the lands 28 undergo the same deformation during temperature changes such that $$\epsilon_{tot} = 0.$$

This is true for direct thermal drift of the sensor itself and for indirect thermal drift of the turret 14 and/or the cross-slide 12.

Two bores 29 are made in the plate 21 in order to receive wires for conducting current. Preferably at least a part of each flexible element 25 is raised above the upper or lower plane of the plate 21 as is visible in FIG. 4 in order to reduce friction between the bolted parts. It is understood that by the words "flexible" or "resilient" are meant a distance of relative movement of about 1 $\mu$m. The elements 25 are not flexible perpendicularly to the plate 21, since the elements 25 are made rigid in that direction and that is because the wear of the turning insert is poorly indicated by the tangential forces acting upon the insert and because the tangential forces are extremely large during machining. The radial forces and the feed forces change during wear of the tool about 20 to 25 times more than the tangential forces during said wear and thus the measurement of the radial forces and the feed forces provides for the most significant resolution. The plate has two positioning holes which are to receive pins projecting from the cross-slide.

The method for sensing forces arising during machining of the work piece in the machine tool is comprised of the following steps:

providing a force sensor 13, which has the shape of a generally planar plate 21 provided with slots 24 defining zones resiliently arranged relative to each other in the plane of the plate, providing gauges on weakened portions 28 between said zones, providing means for fastening and fastening one zone 25 of the plate to a tool holder 14 of the machine and another zone of the plate to a stable support portion 12 of said machine, connecting the force sensor 13 to a signal processing means 20, measuring radial and axial cutting forces only, in the plane of the plate, transferred from the tool holder to the sensor and detecting signals from the sensor by means of the signal processing means in response to the magnitude of the cutting forces arising during machining.

Thus, the present invention relates to a force sensor which is stable and small in height and which can be positioned close to the cutting edge and directly in the path of the transmitted force. Furthermore, it can be used for a wide range of cutting operations and it is not sensitive to temperature changes. Furthermore the present invention relates to a method for sensing forces during machining of a work piece.

Modifications of the force sensor may be made in accordance with the individual standards of each machine tool manufacturer without departing from the scope of the claims.

I claim:

1. A force sensor for a machining tool of the type comprising a stable support portion and a carrier including a tool holder in which a cutting tool is mounted, said force sensor being mounted in between said stable support portion and said carrier, said sensor comprising a generally planar plate which includes slots therein defining first and second zones resiliently arranged relative to each other within the plane of said plate, said zones being interconnected by an interconnecting portion of said plate, said first zone being connected to said carrier and said second zone being connected to said stable support portion, said sensor provided with gauges on a side of said interconnecting portion, said force sensor being flexible only in said plane of said plate, and said gauges arranged to detect forces directed in said plane in response to a machining operation.

2. A force sensor according to claim 1, wherein said gauges comprise strain gauges coupled to a complete Wheatstone-bridge and arranged in pairs such that one of said pairs measures an identical value of deformation as another of said pairs, said one pair measuring compressive deformation and the other of said pairs measuring an elongative deformation.

3. A force sensor according to claim 8, wherein said machining tool comprises a base surface, said stable support portion comprising a cross-slide indirectly mounted on said base surface, said plate being of generally rectangular shape and having pluralities of first and second holes extending therethrough, said first holes disposed at respective corners of said plate for receiving first bolts connecting said second zone to said cross-slide, said second holes being partially surrounded by first slots extending substantially perpendicularly through said plate in spaced relation to said second holes whereby elements of said plate disposed between said slots and said second holes define said second zone, said elements being displaceable relative to said second zone in a direction of movement, said second holes receiving second bolts connecting said first zone to said carrier whereby forces transmitted to said elements from said tool cause said elements to be displaced in said direction of movement.

4. A force sensor according to claim 3, wherein a first pair of said plate elements are arranged diagonally opposite one another, each of said first pair of plate elements being partially bordered by a pair of additional slots having a larger width than said first slot associated with the respective said second hole, adjacent ends of said additional slots being spaced apart to form a thin land therebetween defining said interconnecting portion of said plate interconnecting said second zone and said elements, said lands extending substantially parallel to said direction of movement of said elements, said gauges comprising strain gauges connected in pairs to respective ones of said lands.

5. A force sensor according to claim 4, wherein a second pair of said plate elements are arranged diagonally opposite one another, each of said plate elements of said second pair being partially bordered by two identical ones of said slots which comprise two straight ends and a midportion with is concavely curved relative to said second holes.

6. A force sensor according to claim 3, wherein said elements project beyond a surface of said plate to provide clearance between that plate surface and the one of said cross-slide and said tool holder toward which said plate surface faces.

7. The method for sensing forces arising during machining of a work piece in a machine tool, providing axial, radial and tangential cutting forces comprising the steps of:
  providing a force sensor in the shape of a generally planar plate provided with slots defining zones resiliently arranged relative to each other in the plane of the plate,
  providing means for fastening one zone of the plate to a carrier of a machine and another zone of the plate to a stable support portion of said machine, said carrier including a tool holder,
  connecting the force sensor to a signal processing means,
  measuring only radial and axial cutting forces transferred from the carrier to the sensor and disposed in the plane of the plate,
  detecting signals from the sensor by means of the signal processing means in response to the magnitude of the cutting forces arising during machining.

* * * * *